United States Patent [19]

Czich et al.

[11] Patent Number: 4,819,768

[45] Date of Patent: Apr. 11, 1989

[54] ACTUATING DEVICE FOR A DISC BRAKE FOR AUTOMOTIVE VEHICLES

[75] Inventors: Erhard Czich, Bremthal-Eppstein; Wolfgang Endler, Hofheim; Juergen Wagner, Oberursel-Weiss-kirchen, all of Fed. Rep. of Germany

[73] Assignee: Alfred Teves GmbH, Frankfurt, Fed. Rep. of Germany

[21] Appl. No.: 94,244

[22] Filed: Sep. 8, 1987

[30] Foreign Application Priority Data

Sep. 12, 1986 [DE] Fed. Rep. of Germany ....... 3631036

[51] Int. Cl.[4] .................. F16D 65/38; F16D 65/56
[52] U.S. Cl. .................. 188/196 D; 188/202; 384/50
[58] Field of Search ............... 188/71.7–71.9, 188/72.1, 72.6–72.9, 343, 79.5 S, 79.5 GE, 79.5 K, 196 M, 196 D, 196 V, 202; 192/70.23, 70.25, 93 A; 384/42, 50, 58, 909

[56] References Cited

U.S. PATENT DOCUMENTS

| 2,444,432 | 7/1948 | Eckert | 384/58 X |
| 4,461,375 | 7/1984 | Brown | 192/93 A X |
| 4,596,179 | 6/1986 | Bando | 384/58 X |

FOREIGN PATENT DOCUMENTS 3445564 6/1986 Fed. Rep. of Germany.

Primary Examiner—Andres Kashnikow
Assistant Examiner—Robert J. Oberleitner
Attorney, Agent, or Firm—James B. Raden

[57] ABSTRACT

An actuating device for a disc brake, in particular for automotive vehicles, has a rotatably supported actuating member and a transforming device for transforming a rotary motion into an axial motion. A part of the transforming device may be held by a holding element whereby the transforming device may be non-rotatable and axially displaceable. The holding element has a rotatably supported part fixed to the brake housing. Friction-reducing means is provided between the rotatable part and the element fixed to the housing.

4 Claims, 2 Drawing Sheets

ACTUATING DEVICE FOR A DISC BRAKE FOR AUTOMOTIVE VEHICLES

BACKGROUND OF THE INVENTION

This invention relates to an actuating device for a disc brake used for automotive vehicles.

One such actuating device is disclosed in German Patent No. 34 45 564 A1. In this actuating device an actuating member is provied in the form of a rotatably supported actuating lever acting on a roller ramp device transforming the rotary motion of the acutating lever into an axial motion. To this end, one element of the roller ramp is connected with the rotatable actuating lever whereas the other element of the roller ramp is held non-rotatably, yet axially displaceably, by means of a pin fastened to the housing. The non-rotatable element acts on the adjustng nut of a longitudinally adjustable thrust member.

This actuating device works in a generally satisfactory manner. However, it has been found that the holding element for holding the roller ramp element non-rotatably and axially displaceably has to receive extremely high supporting forces (approximately 20,000 N) and this impairs the efficiency of the actuating device. In some cases, it is desirable to improve the efficiency of the actuating device.

SUMMARY OF THE INVENTION

It is thus an object of this invention to provide an actuating device for a disc brake of an automotive vehicle which has improved efficiency.

According to this invention this object is provided by reducing the friction force in a relatively simple manner, whereby the efficiency of the brake improves without the holding element's capacity for receiving high supporting forces becoming impaired.

One advantageous embodiment of this invention provides that the holding element has a rotatably supported part supported on a bolt fastened to the housing and a sliding coating provided between the bolt and the rotatable part. Without any additional components, it is thus possible to bring about an essential reduction in friction losses and, hence, an improvement in efficiency.

It is especially expedient for the bolt arranged fast with the housing to have a partially conical design in, at least, the area of support of the rotatable part. It is thus possible to provide an adaptation in correspondence with the ensuing bending stress.

Advantageously, the holding element has a stepped design and a seal is arranged between the holding element and the housing bore receiving the same.

Another advantageous embodiment of this invention provides that the holding element has a rotatable part supported at a part fastened to the housing and also provides that a roller bearing is arranged between the rotatable part and the fastened part. Structural expenditure is somewhat increased, but efficiency is improved quite considerably. Preferably, the rotatably supported part is a smooth pin so that there are practically no notch effects and the mechanical strength of the pin is not impaired. According to a further embodiment, a needle bearing is considered a suitable bearing with the rotatably supported part and the roller bearing being arranged in a hollow screw.

BRIEF DESCRIPTION OF THE DRAWING

Examples of embodiments of this invention will be described in conjunction with the drawing in which.

DETAILED DESCRIPTION OF THE PREFERRED EMBODIMENTS

Figure 1:
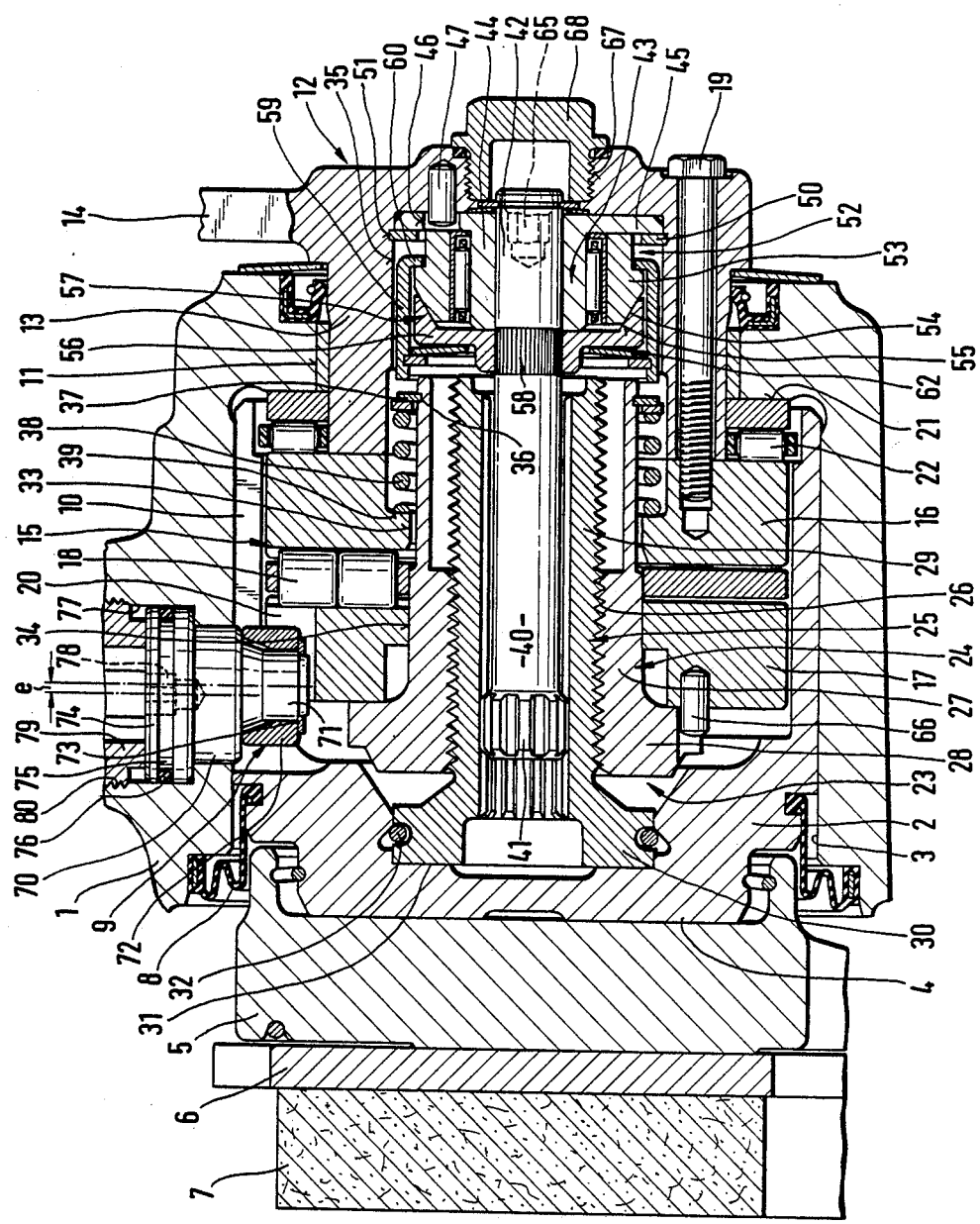
FIG. 1 is a longitudinal section through an actuating device in accordance with this invention.

Reference is first made to FIG. 1 showing a longitudinal section through a part of a disc brake housing 1 having axial cavity 10 therein; where there is arranged an actuating device for a brake piston 2. The cup-shaped brake piston 2 is arranged in an axially displaceable manner in an axial bore 3 of the brake housing 1 with the bottom 4 of the brake piston facing an intermediate element 5 and resting thereon. The intermediate element 5 rests at the backing plate 6 of a brake pad 7, whereby the latter, upon an axial displacement of the brake piston 2, is likewise displaced axially via the intermediate element 5 and is pressed against a brake disc (non-illustrated). When the brake pad 7 is applied to the brake disc a reaction force results and displaces the brake housing 1 in the opposite direction, whereby a limb (not illustrated) of the brake housing 1 presses a brake pad on the other side of the brake disc (not illustrated) against the other side of the brake disc. A protecting cap 8 is provided in order to protect the bore 3 from becoming dirty. The protecting cap 8 is fastened in grooves on the brake housing 1 and on the brake piston 2.

To actuate the brake, an actuating member 12 is supported in a rotatable manner in an end-side bore 11 of the brake housing 1. The actuating member 12 has a cylindrical supporting portion 13 and an actuating lever 14. The cylindrical supporting portion 13 extends through the bore 11 into the bore 3 where it rests with one of its front faces on a device 15 that transforms the rotary motion of the actuating member 12 into an axial motion.

In this case, the device 15 is a roller ramp having two ramp elements 16, 17 with rollers 18 arranged between them. The ramp element 16 faces the actuating member 12 and is non-rotatably connected with member 12 by means of screws 19 so that a rotary motion of the actuating member 12 directly causes the ramp element 16 to turn. The other ramp element 17 is non-rotatably arranged by an eccentric element 9 non-rotatably fixed to the housing 1 and reaching through a slit provided in the piston 2 to engage a corresponding recess 20 of the ramp 17. The recess 20 is axially extending, thus allowing the ramp element 17 to carry out an axial motion, while precluding rotary motion. Between the bottom 21 of the bore 3 and the ramp element 16, a roller bearing 22 is arranged on a disk.

By means of its ramp element 17, the device 15 acts against a longitudinally adjustable thrust member 23 formed by an adjusting nut 24 and an adjusting spindle 25 which are in mesh with each other via a selflocking thread 26. The adjusting nut 24 has an axially extending shaft portion 27 and radially extending flange portion 28. The adjusting spindle 25, too, consists of an axial shaft portion 29 and of a radial flange portion 30. The flange portions 28 and 30 of the adjusting nut and adjusting spindle, respectively, face the bottom 4 of the brake piston 2. In doing so, the flange portion 30 of the adjusting spindle 25 rests with its front face 31 on the bottom 4 of the brake piston 2 and is connected with the brake piston via a safety device 32. Through central bores 33, 34 provided in the ramp elements 16, 17, respectively, the shaft portions 27, 29 of the adjusting nut 24 and adjusting spindle 25, respectively, extend toward the actuating member 12, with their ends being arranged in a cylindrical recess 35 of the actuating member 12. At the outside circumference of the shaft portion 27 of the adjusting nut 24, an annular groove 36 is provided wherein a ring 37 is seated. One end of a compression spring 38 supports itself on the ring 37 and the other end thereof rests at a shoulder 39 on the ramp element 16. Thus, the adjusting nut 24 is pressed with one of its front faces of its flange portion 28 against a front face of the ramp element 17 where it remains abutted.

Clutches are arranged in the recess 35 of the actuating member 12. A serrated shaft 40 is arranged within the hollow adjusting spindle 25 and has a toothed portion 41 essentially arranged within the hollow spindle 25 so as to connect the serrated shaft 40 axially displaceably, yet non-rotatably, with the adjusting spindle 25. Further, the serrated shaft 40 has a supporting portion 42 projecting from the hollow adjusting spindle 25 in the direction of the actuating member 12. A sleeve 43 is rotatably arranged on the supporting portion 42 of the serrated shaft 40. The sleeve 43 has an axially extending cylindrical portion 44 and a radially extending flange portion 45. Provided within the flange portion 45 of the sleeve 43 is a recess 46 extending over a part of the circumference of the flange portion 45 and engaged by a pin 47 fastened within the actuating member 12.

For axially securing the sleeve 43 in position, a ring 50 is provided which is seated in an annular groove 51 of the actuating member 12. Provided on the cylindrical portion 44 of the sleeve 43 is a unidirectional clutch 52 which, in this case, is formed by a needle-roller-type freewheel. The outer clutch ring 53 of the clutch has a cone 54 cooperating with a cone 55 formed on a clutch element 56 so as to form a friction clutch 57 with the same. The clutch element 56 is arranged non-rotatably, yet axially displaceably, on the serrated shaft 40 via teeth 58.

In the axial direction, the clutch element 56 is held by a cage 59 having flange portion 60 which engages clutch ring 53. A Belleville spring washer 62 is provided behind clutch element 56 and presses the clutch element 56 against the clutch ring 53 in order to effect a friction contact between the cone 54 and the cone 55. At the end of the supporting portion 42 of the serrated shaft 40 a recess 65 is formed and is provided with an internal hexagon for the insertion of a corresponding tool for turning the serrated shaft 40.

In the following, the mode of operation of the actuating device and of the adjusting device is described.

Upon a turn of the actuating member 12 and of the ramp element 16 firmly connected therewith, the two ramp elements 16 and 17 are twisted relative to each other as the ramp element 17 is held non-rotatably by the eccentric element 9. Consequently, the non-rotatable ramp element 17 receives an axial motion which is transmitted to the adjusting nut 24 held by means of a pin 66 so as to be likewise non-rotatable. The adjusting nut 24 transmits the axial motion to the adjusting spindle 25 via the selflocking thread 26, and the adjusting spindle 25 acts against the brake pad 7 via the brake piston 2 and the intermediate element 5 so as to press the brake pad 7 agaist the brake disc. This movement takes place against the force of the compression spring 38. If, due to some wear of the brake pads, the actuating member 12 surpasses a certain angle of rotation, the pin 47 comes to abut on a lateral limit of the recess 46. Thus the sleeve 43 is carried along. Via the locked freewheel 52 and the friction clutch 57, the twisting movement is transmitted to the serrated shaft 40 which twists the adjusting spindle 25 by the corresponding angle. As the clamping force is built up, a friction torque is formed at the flanks of the adjusting thread 26. In case of a certain clamping force which, e.g., may amount to 3,000 to 5,000 N, said friction torque exceeds that of the friction clutch 57 which thereupon slips through. Thus, no further movement resulting from expansion is transmitted. After the application of the brake, the actuating member 12 is twisted in the opposite direction. Said rotary motion remains without any effect on the adjusting device as the unidirectional clutch 52 is freewheeling in this direction. In order to return the mechanical actuating device into the initial position again when exchanging pads all that is required after the removal of the screw plug 68 locking the opening 67 in the actuating member 12 is to insert a hexagonal wrench into the recess 65 at the end of the serrated shaft 40 so as to turn the same back to its stop.

In this embodiment, the eccentric element 9 has a double function in that it holds the ramp element 17 so as to be non-rotatable and offers a possibility of adjustment. To this end, the eccentric element has a cylindrical main body 70 with a cylindrical extension 71 formed on one end in an eccentric manner. The eccentricity is determined by the distance 'e' of the axes of symmetry of the main body 70 and of the extension 71. Supported on the extension 71 is a ring 72. It is held there by means of a retaining ring 73. Between the cylindric extension 71 and by the ring 72 a sliding (low friction) coating, for instance, MOLYDAG (06396), is provided. This coating can be applied either to the extension or to the inside of surface of the ring 72. Formed on the other end of the main body 70 is a cylindrical portion 74 of enlarged diameter which has an annular groove 75 at its circumference. A seal 76 is inserted into the annular goove 75. The eccentric element is inserted into a stepped bore 77 provided in the disc brake housing 1 and is sealed relative to the walls of the bore by means of the seal 76. In the cylindrical portion 74 a recess 78 is formed and has a hexagonal cross-section. A tool can be inserted into the recess 78 and used to twist the eccentric element 9. To hold the eccentric element 9 non-rotatably in the stepped bore 77, a set screw 79 is provided and is screwed into a threaded portion 80 of the stepped bore until its front face presses against the upper side of the cylindrical portion 74. Thus the eccentric element 9 is held in place by means of frictional engagement. After loosening of the set screw 79 it is possible to use the tool to turn the eccentric element 9. Thus the basic position of the ramp element 17 is changed correspondingly and, thus, the position of the actuation member 12 at the same time. After adjusting the eccentric element 9 the set screw is tightened again so as to be able in the adjusted position to receive the supporting torque transmitted by the ramp element 17 upon actuation.

Figure 2:
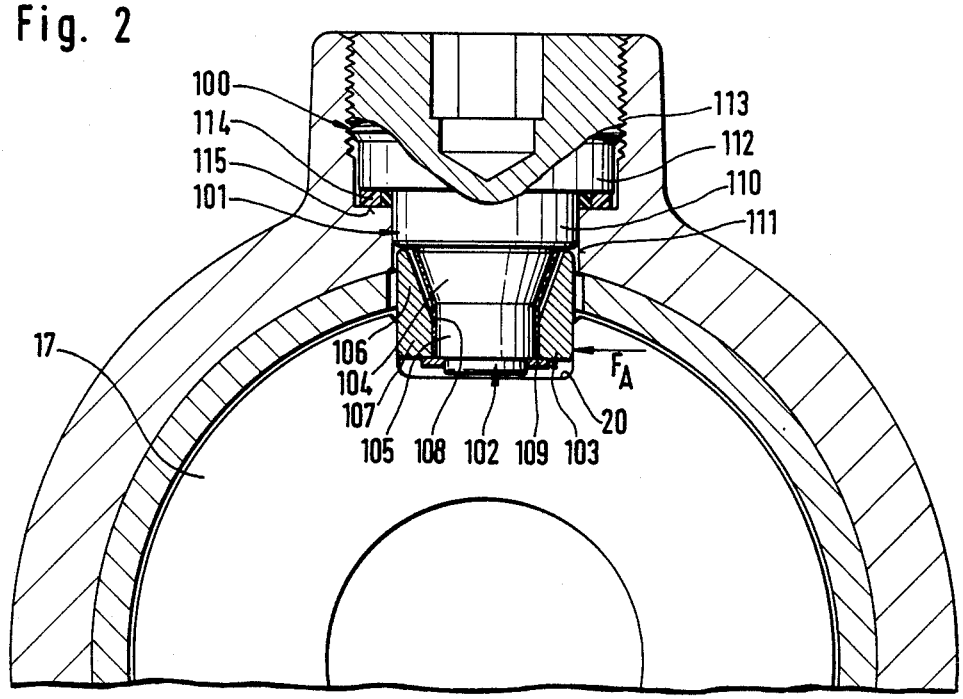
FIG. 2 is an enlarged cross-section showing another embodiment of a holding element of a disc brake.

Reference is now made to FIG. 2 wherein another embodiment of the holding element is shown. This holding element 100 lacks the adjusting function. The holding element 100 has a stepped main body 101 with an extension 102 formed on one end. The extension 102 carries a roller 103 and has a conical portion 104 adjacent the main body 101 and a cylindrical portion 105 following the conical portion 104. The roller 103 has a corresponding conical portion 106 and a corresponding cylindrical portion 107. A sliding (low friction) coating 108 is provided between the roller 103 and the extension 102. In this case, the sliding coating 108 is applied to the extension 102. For the purpose of holding the rollre 103, a ring 109 is fastened at the free end of the extension 102. The main body 101 has a portion 110 of reduced diameter adapted to the diameter of a housing bore section 111. The essential part of the circumferential forces is transmitted via said portion 110. Following portion 110 is a portion 112 of enlarged diameter followed by a threaded portion 113 via which the holding element 100 is screwed into a corresponding thread of the stepped housing bore. Provided at the step between the portion 110 and the portion 112 is a seal 114 lying on a step 115 of the housing bore. In the illustrated embodiment some play is provided between the conical portion 110 of the extension 102 and the corresponding portion of the roller 103, thus only the cylindrical portion 105 rests on the extension. Consequently, the coating, too, can be provided only in this area. The width of the recess 20 of the ramp element 17 is adapted to the diameter of the roller 103. The forces effective in the circumferential direction are indicated in FIG. 2 by the arrow $F_4$.

Figure 3:
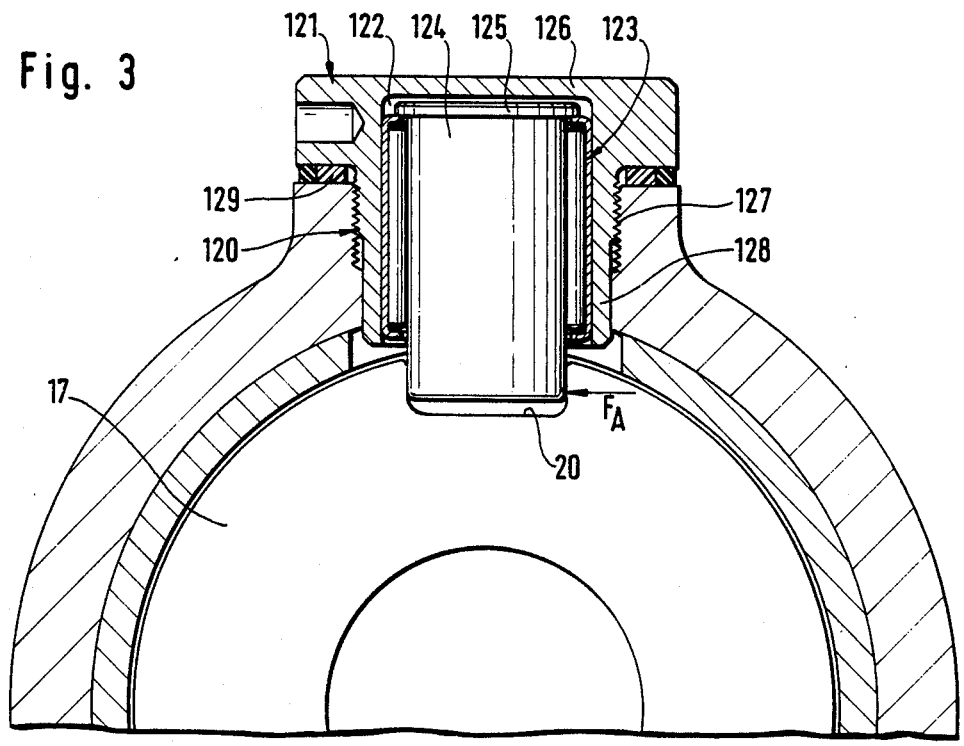
FIG. 3 is an enlarged cross-section showing a further embodiment of the holding element.

In another embodiment, a holding element 120 is illustrated in FIG. 3 and includes a screw 121 provided which has a central hollow space 122. Arranged in said hollow space is a roller bearing, as for example, in the form of needle bearing 123 carrying a cylindrical, smooth pin 124. The pin has a head 125 at its upper end, which supports itself on the cage of the needle bearing 123. Thus the pin 124 is axially secured against displacement. The lower portion of the pin 124 extends beyond the needle bearing 123 and engages the recess 20 of the ramp element 17. The screw 121 has a head 126, a threaded portion 127 and a cylindrical portion 128 adapted to fit a corresponding housing bore section. Arranged between the head 126 and a surface formed at the housing is a seal 129.

What is claimed is:

1. An actuating device for a disc brake used in automotive vehicles, said device comprising a rotatable actuating member, a transforming device cooperatively connected to said actuating member for transforming rotary motion into an axial motion, said transforming device including an axially moveable component for acting against a brake application member to apply an axial force to said brake application member, a holding element retained in a brake housing for holding said component of said transforming device to preclude rotation of said component while allowing axial movement of said component, said holding element including a first element fastened to said housing and a rotatable member rotatably supported on said first element and a friction-reducing means provided between said rotatable member and said first element, said first element comprising a bolt and said friction reducing means comprising a coating provided between said bolt and said rotatable member, said bolt including a portion thereof with a conical configuration in the area of support of the rotatable member.

2. An actuating device for a disc brake used in automotive vehicles, said device comprising a rotatable actuating member, a transforming device cooperatively connected to said actuating member for transforming rotatory motion into an axial motion, said transforming device including an axially moveable component for acting against a brake application member to apply an axial force to said brake application member, a holding element retained in a brake housing for holding said component of said brake application member, a holding element retained in a brake housing for holding said component of said transforming device to preclude rotation of said component while allowing axial movement of said component, said holding element including a first element fastened to said housing and a rotatable member rotatably supported on said first element and a friction-reducing means provided between said rotatable member and said first element, said rotatable member being rotatably supported upon said first element and said friction reducing means including a roller bearing positioned between said rotatable member and said first element, wherein said rotatable member is a pin.

3. An actuating device for a disc brake used in automotive vehicles, said device comprising a rotatable actuating member, a transforming device cooperatively connected to said actuating for transforming rotary motion into an axia motion, said transforming device including an axially moveable component for acting against a brake application member to apply an axial force to said brake application member, a holding element retained in a brake housing for holding said component of said transforming device to preclude rotation of said component while allowing axial movement of said component, said holding element including a first element fastened to said housing element including a first element fastened to said housing and a rotatable member rotatably supported on said first element and a friction-reducing means provided between said rotatable member and said first element, said rotatable member being rotatably supported upon said first element and said friction reducing means including a roller bearing positioned between said rotatable member and said first element, wherein said rotatable member and said roller bearing are arranged in a hollow space of a screw.

4. An actuating device for a disc brake used in automotive vehicles, said device comprising a rotatable actuating member, a transforming device cooperatively connected to said actuating member for transforming rotary motion into an axial motion, said transforming device including an axially moveable component for acting against a brake application member to apply an axial force to said brake application member, a holding element retained in a brake housing for holding said component of said transforming device to preclude rotation of said component while allowing axial movement of said component, said holding element including a first element fastened to said housing and a rotatable member rotatably supported on said first element and a friction-reducing means provided between said rotatable member and said first element, wherein said holding element has an eccentric configuration.

* * * * *